Oct. 28, 1952          J. M. LEAKE          2,615,764

HUB

Filed July 10, 1948

INVENTOR.

James M. Leake

Patented Oct. 28, 1952

2,615,764

UNITED STATES PATENT OFFICE 2,615,764

HUB

James M. Leake, Monroe, Mich.

Application July 10, 1948, Serial No. 38,105

6 Claims. (Cl. 308—110)

My invention relates to hubs for pulleys, gears or any type of lever that is journaled on a shaft.

Heretofore hubs have been riveted, welded or brazed to the pulleys, gears or arms on which they were used. My improved hub comprises a tubular member that is secured permanently by expanding a portion of the tubular member into an annular groove in the pulley, gear or arm to which it is secured. My hub also provides an ideal means for lubricating the shaft upon which it is journaled. My improved hub also eliminates expensive machining processes required in making cast iron hubs. Since my improved hub is made from tubular metal it is possible to get the same strength with less weight than is possible with castings or forgings. My improved hub also eliminates brazing processes which are sometimes employed in securing hubs. Brazing processes are objectionable because the heat destroys hardness and strength qualities of the metal.

One of the objects of my invention is to provide a hub that eliminates expensive machining processes.

Another object of my invention is to provide a hub that is light in weight.

Another object of my invention is to provide a hub that eliminates brazing processes.

Another object of my invention is to provide a hub that provides a sealed lubricating means.

Another object of my invention is to provide a hub that readily adapts itself to quantity production.

Another object of my invention is to provide a hub for pulleys, gears or levers that is simple, strong, durable and inexpensive.

With these and other objects in view, my invention consists in the construction, combination and arrangements of the various parts of my improved device as described in the specification, claimed in the claims and illustrated in the accompanying drawing.

Figure 1:
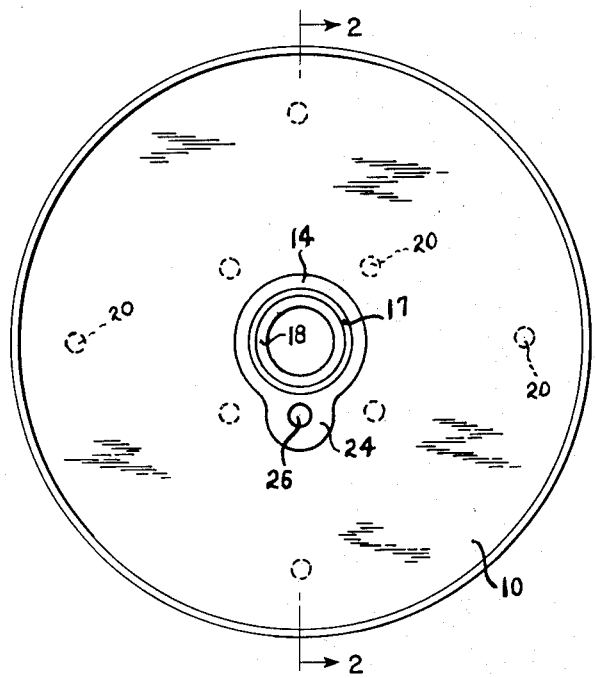
Fig. 1 is a front elevation of a pulley embodying my novel invention.
Figure 3:
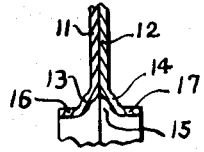
Fig. 3 is a fragmentary sectional view showing a portion of the web of the pulley before the hub is placed in position.

Referring to the drawings I have shown in Fig. 1 a pulley composed of two stampings 9 and 10, the stampings 9 and 10 are provided with integral web members 11 and 12. Annular dished portions 13 and 14 provide an annular groove 15 as shown in Fig. 3. Annular flanges 16 and 17 extend outwardly from the annular dished portions 13 and 14.

Figure 4:
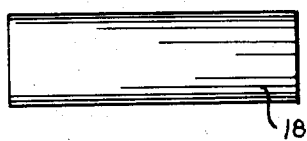
Fig. 4 is a front view of the tubular hub member before it is secured in the pulley.

A tubular hub member 18 shown in Fig. 4 is located in the annular flanges 16 and 17. The hub is then confined so that it can not expand inwardly nor outwardly except into the annular groove 15. Pressure is then applied toward the annular groove 15 from both ends of the hub 18. A portion 19 of the hub 18 is thereby expanded to fit securely in the groove 15. The hub 18 is then securely held in position by the annular expanded portion 19.

The two web members are preferably welded together by spot welds 20, although any suitable means may be used for securing the two web members 11 and 12 together.

Figure 2:
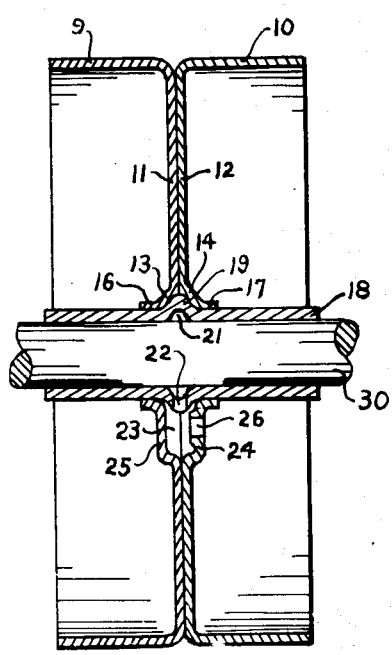
Fig. 2 is a sectional view taken along line 2—2 of Fig. 1.

When the hub 18 is journaled on a shaft 30 as shown in Fig. 2 an annular oil or grease passageway 21 is provided. The annular passageway 21 is connected to a grease or oil chamber 23 by means of the passageway 22. The oil chamber 23 is formed by suitable cupped portions 24 and 25 formed in the web members 11 and 12. In aperture 26 any suitable type of grease or oil fitting is provided in the cupped portion 24. When oil or grease is forced or fed into the chamber 23 it passes through the passageway 22 and then into the annular oil or grease passageway 21.

Figure 5:
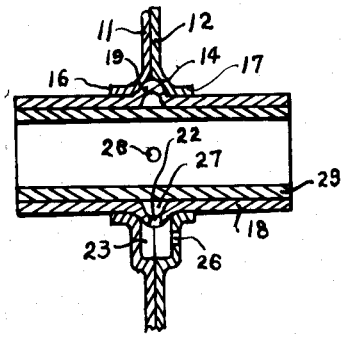
Fig. 5 is a fragmentary sectional view showing a variation of my invention.

The structure disclosed in Fig. 5 varies from the above described structure in that a tubular bearing member 29 is secured in the hub member 18. One or more passageways 28 then connect the annular oil or grease passageway 27 to the inner surface of the tubular bearing member 29. In this structure the hub member 18 provides a strong hub, while the tubular member 29 provides a high quality bearing surface.

In some cases it is desirable to expand the annular portion 19 before the pulley members 9 and 10 are assembled. It will readily be seen that this method of assembly would produce a hub like shown in Fig. 2.

From the foregoing description it can be readily seen that my improved type of hub has many advantages to those used at the present time. Greater strength per unit weight is secured with my novel hub construction. All expensive machining processes are eliminated in my novel hub structure. The annular expanded portion 19 of the hub serves a dual purpose. It secures the hub in position and also provides an oil or grease passageway. Furthermore the annular expanded portion 19 prevents oil or grease from leaking through between the two web members 11 and 12.

It can readily be seen that many modifications in my invention can be made without departing from the scope thereof. For example my hub could be used in combination with a cast or forged pulley, gear or lever if a suitable groove is provided into which the annular expanded hub portion 19 can be secured.

While I have described the details of several forms of my invention, it is to be understood that I am not to be limited to these details except by the scope of the appended claims.

Having thus described my invention what I claim is:

1. A hub comprising superimposed layers, an annular groove formed by said superimposed layers, annular flanges integral with and extending in opposite directions from said superimposed layers in axial alignment with said annular groove, and a tubular bushing located in said annular flanges and permanently secured in position by an annular expanded portion intermediate the ends of said tubular bushing located in said annular groove.

2. A hub comprising a bushing support and a tubular bushing, said bushing support comprising superimposed layers, an annular groove formed by said superimposed layers, annular flanges extending in opposite directions from said superimposed layers in axial alignment with said annular groove, said tubular bushing located in said annular flanges and permanently secured in position by an annular expanded portion of said bushing intermediate its ends located in said annular groove, and a tubular bearing member secured in said tubular bushing.

3. A hub comprising superimposed layers, an annular groove formed by said superimposed layers, annular flanges integral with and extending in opposite directions from said superimposed layers in axial alignment with said annular groove, a tubular bushing located in said annular flanges and permanently secured in position by an annular expanded portion of said hub located in said annular groove, an annular lubricant passageway provided by said annular expanded portion of said tubular bushing and a lubricant passageway extending outwardly from said annular lubricant passageway.

4. A hub comprising a laminated web member, annular flanges integral with and extending outwardly in axial alignment from said laminated web member, an annular groove formed by said web member in axial alignment with said annular flanges, a tubular bushing member located in said annular flanges, an annular portion of said tubular bushing member expanded into said annular groove whereby said bushing is permanently secured in position and whereby an annular lubricant passageway is provided.

5. A hub comprising two superimposed layers secured together and provided with annular flanges integral with and extending in opposite directions from said superimposed layers, said annular flanges providing a bore transverse to said superimposed layers, an annular groove extending radially outwardly from said bore adjacent the junction of said superimposed layers and a tubular bushing located in said bore, said tubular bushing provided with an annular expanded portion intermediate its ends, said expanded portion located in and substantially filling said annular groove.

6. A hub comprising two metal layers secured together in juxtaposition and provided with annular flanges integral with said metal layers and extending in opposite directions therefrom, a bore provided in said annular flanges in axial alignment therewith, an annular groove extending radially outwardly from said bore adjacent the junction of said two metal layers, a tubular bushing located in said bore, said tubular bushing provided with an annular expanded portion intermediate its ends, the outer periphery of said annular expanded portion engaging the walls of said annular groove and the inner periphery of said expanded portion providing an annular lubricant passageway in the inner surface of said tubular member.

JAMES M. LEAKE.

REFERENCES CITED

The following references are of record in the file of this patent:

UNITED STATES PATENTS

| Number | Name | Date |
|---|---|---|
| 382,893 | Miller | May 15, 1888 |
| 774,927 | Zamboni | Mar. 14, 1904 |
| 1,469,397 | Smithfield | Oct. 2, 1923 |
| 1,734,025 | Zeibig | Oct. 29, 1929 |
| 1,792,645 | Larsh | Feb. 17, 1931 |
| 2,195,749 | Lignion | Apr. 2, 1940 |